E. S. ERICKSON.
CORD HOLDER.
APPLICATION FILED AUG. 5, 1918.
1,295,717.
Patented Feb. 25, 1919.
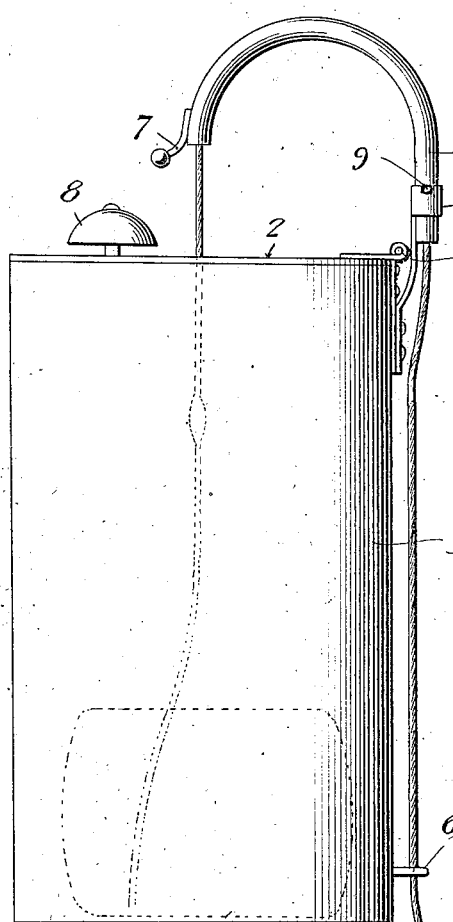
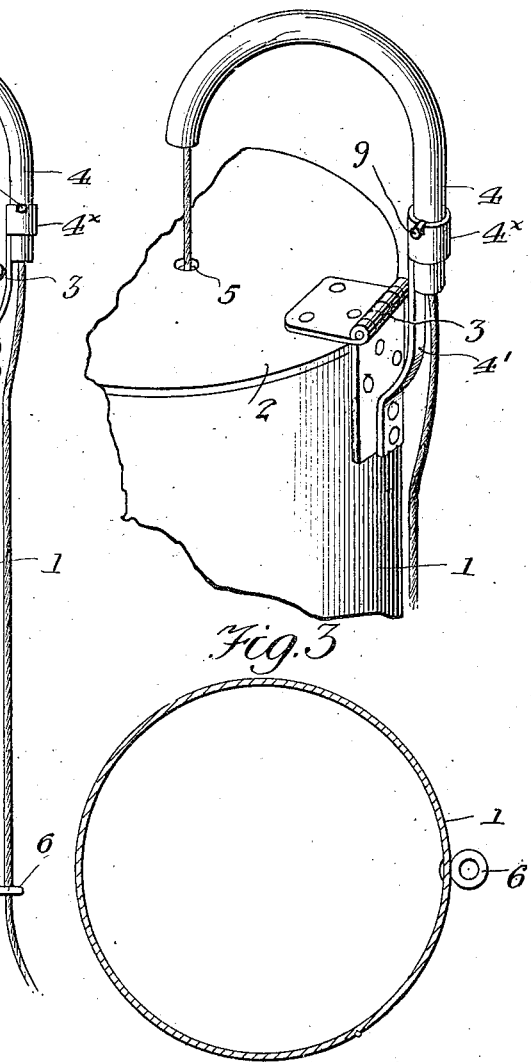
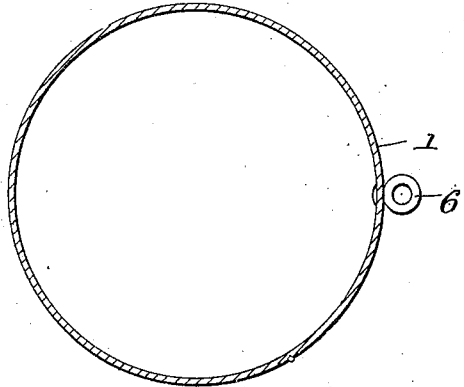
Witnesses
Le Roy Kauffman
L. D. Middleton
Inventor
E. S. Erickson
By Victor J. Evans
Attorney

UNITED STATES PATENT OFFICE.

EDWARD S. ERICKSON, OF DE LAMERE, NORTH DAKOTA.

CORD-HOLDER.

1,295,717.

Specification of Letters Patent. Patented Feb. 25, 1919.

Application filed August 5, 1918. Serial No. 248,472.

*To all whom it may concern:*

Be it known that I, EDWARD S. ERICKSON, a citizen of the United States, residing at De Lamere, in the county of Sargent and State of North Dakota, have invented new and useful Improvements in Cord-Holders, of which the following is a specification.

This invention relates to new and useful improvements in twine holders for grain binders and the principal object of the invention is to provide means for passing the twine from the box in a curved path to reduce the strain thereon.

Another object of the invention is to provide means for notifying the operator that the twine is not running properly.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of a twine box provided with my invention.

Fig. 2 is an enlarged view of the means for connecting the lid and tube to the box.

Fig. 3 is a sectional view.

As shown in these views the twine is carried by a box or receptacle 1 which is provided with a top 2. The top is provided with a hinge 3. 4 is a tube connected with the hinge by a strap 4'. The strap carries a socket 4* which receives the end of the tube. A pin 9 engaging a recess in the top edge of the socket holds the tube in normal position. This permits the tube to be turned to allow the top to be raised to insert the ball of twine. The free end of the tube is of curved shape as shown. The lid is provided with a central opening 5 through which the twine passes, and the end of the tube is so located that the twine passes upwardly from the opening 5 into said tube so that said twine will bear but lightly against the edges of the opening. Said twine passes through the tube and through the end thereof located adjacent the hinge and then passes through suitable guides 6 secured to the box and so on to the binder means.

The end of the tube is provided with a downwardly extending arm 7 which is adapted to engage with the striker of an alarm bell 8 when the lid 2 is raised, said bell being carried by the lid.

When an enlargement or twist occurs in the twine, which is too large to pass through the opening 5, the lid or cover 2 will be raised so as to bring the bell against the arm and thus sound the alarm. In most cases the raising of the top itself will notify the operator that the twine is about to break.

It will be seen that by reason of the tube the twine is caused to follow a curved path so as to render the twine less liable to breakage than if the twine is passed directly over the top at right angles as is the case with twine boxes now in use.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. A twine holder for binders comprising a hinged cover having an opening therein through which the twine passes and a guiding tube having an end spaced from said cover to limit the movement thereof and arranged to receive the twine passing through said opening.

2. A twine holder for binders comprising a cover provided with a spring hinge and having an opening therein through which the twine passes, an arm located above the top and an alarm carried by the top and adapted to strike said arm when the top is raised.

3. A twine holder for binders comprising a top, a spring hinge therefor, said top having an opening therein through which the twine passes, a curved tube carried by the top through which the twine passes, an arm on said tube and an alarm bell on the top for engaging said arm when the top is raised.

In testimony whereof I affix my signature.

EDWARD S. ERICKSON.